United States Patent
Mukai (10) Patent No.: US 10,629,917 B2
(45) Date of Patent: Apr. 21, 2020

(54) SEPARATOR FOR FUEL CELLS, FUEL CELL, FUEL CELL STACK, AND METHOD OF MANUFACTURING SEPARATOR FOR FUEL CELLS

(71) Applicant: TOYO KOHAN CO., LTD., Tokyo (JP)

(72) Inventor: Nobuaki Mukai, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 525 days.

(21) Appl. No.: 14/650,236

(22) PCT Filed: Nov. 26, 2013

(86) PCT No.: PCT/JP2013/081721
§ 371 (c)(1),
(2) Date: Jun. 5, 2015

(87) PCT Pub. No.: WO2014/087878
PCT Pub. Date: Jun. 12, 2014

(65) Prior Publication Data
US 2015/0340714 A1    Nov. 26, 2015

(30) Foreign Application Priority Data
Dec. 7, 2012    (JP) .................... 2012-267875

(51) Int. Cl.
| | | |
|---|---|---|
| *H01M 8/0228* | (2016.01) | |
| *C23C 18/16* | (2006.01) | |
| *C23C 18/31* | (2006.01) | |
| *H01M 8/0206* | (2016.01) | |
| *C23C 18/42* | (2006.01) | |
| *C23C 18/54* | (2006.01) | |
| *C23C 18/18* | (2006.01) | |

(Continued)

(52) U.S. Cl.
CPC ......... *H01M 8/0228* (2013.01); *C23C 18/165* (2013.01); *C23C 18/1651* (2013.01);
(Continued)

(58) Field of Classification Search
CPC . H01M 2/14–1613; H01M 2/164–166; H01M 2/1673; H01M 2/1686;
(Continued)

(56) References Cited

U.S. PATENT DOCUMENTS 6,291,094 B1 *   9/2001   Yoshimura .......... H01M 8/0204
                                                       427/115
2001/0028974 A1 *  10/2001   Nakata ................ H01M 8/0204
                                                       429/517

(Continued)

FOREIGN PATENT DOCUMENTS

| CN | 104471109 A | 3/2015 |
| EP | 2873752 A1 | 5/2015 |

(Continued)

OTHER PUBLICATIONS

Machine tranlsation of Shimada et al, JP 2005-302669 (Oct. 27, 2005).*

(Continued)

*Primary Examiner* — Jonathan G Leong
*Assistant Examiner* — Jacob Buchanan
(74) *Attorney, Agent, or Firm* — Muncy, Geissler, Olds & Lowe, P.C.

(57) ABSTRACT

A separator for fuel cells is provided. The separator includes: a base material; an underlying plate layer formed on the base material; and a gold plate layer formed on the underlying plate layer by means of electroless plating. The separator is characterized in that a face of the underlying plate layer facing the gold plate layer has an arithmetic average roughness Ra of 80 nm or less. According to the present invention, there can be provided a separator for fuel cells in which the gold plate layer can be uniformly formed for irregular parts that constitute gas flow channels and the occurrence of unformed parts and pinholes in the gold plate layer is prevented without increasing the film thickness of the gold plate layer and which is excellent in the corrosion resistance and the conductivity.

16 Claims, 3 Drawing Sheets

(51) Int. Cl.
*C23C 18/36* (2006.01)

(52) U.S. Cl.
CPC ...... *C23C 18/1806* (2013.01); *C23C 18/1844* (2013.01); *C23C 18/31* (2013.01); *C23C 18/36* (2013.01); *C23C 18/42* (2013.01); *C23C 18/54* (2013.01); *H01M 8/0206* (2013.01); *Y02P 70/56* (2015.11)

(58) Field of Classification Search
CPC ........ H01M 8/0202–0269; C23C 18/16–1896; C23C 18/31–36; C23C 18/42–44; C23C 18/48–54
See application file for complete search history.

(56) References Cited

U.S. PATENT DOCUMENTS

| | | | | |
|---|---|---|---|---|
| 2005/0100758 | A1* | 5/2005 | Hisada | C25D 3/48 428/672 |
| 2005/0123816 | A1* | 6/2005 | Gao | H01M 8/0206 429/480 |
| 2010/0209786 | A1* | 8/2010 | Suzuki | H01M 8/0206 429/400 |
| 2013/0266862 | A1* | 10/2013 | Okuno | B32B 15/01 429/211 |
| 2015/0176134 | A1 | 6/2015 | Mukai | |

FOREIGN PATENT DOCUMENTS

| | | | |
|---|---|---|---|
| JP | 2000-226672 A | 8/2000 | |
| JP | 2001-351642 A | 12/2001 | |
| JP | 2004232070 A * | 8/2004 | |
| JP | 2005-302669 A | 10/2005 | |
| JP | 2009-102676 A | 5/2009 | |
| JP | 2010-9810 A | 1/2010 | |
| JP | 2010-177212 A | 8/2010 | |
| WO | WO-2004038063 A1 * | 5/2004 | ............ C23C 18/42 |
| WO | WO-2011149019 A1 | 12/2011 | |

OTHER PUBLICATIONS

Machine translation of WO 2004/038063 (May 2004).*
Machine translation of Maruko JP-2004-232070. (Year: 2004).*
The extended European Search Report dated Jun. 23, 2016 in corresponding application No. 13860409.5-1373/2930773.
European Office Action dated Feb. 18, 2019 in EP Application No. 13 860 409.5 (4 pages).

* cited by examiner

FIG. 1

*Each value of Examples and Comparative Examples represents the concentration of dissolved ions of (Ni, P and Al), and the value of SUS316L represents the concentration of dissolved ions of (Fe, Cr, Mo and Ni).

FIG. 3

SEPARATOR FOR FUEL CELLS, FUEL CELL, FUEL CELL STACK, AND METHOD OF MANUFACTURING SEPARATOR FOR FUEL CELLS

BACKGROUND OF THE INVENTION

1. Technical Field of the Invention

The present invention relates to a separator for fuel cells, a fuel cell, a fuel cell stack, and a method of manufacturing a separator for fuel cells.

2. Description of the Related Art

A separator for fuel cells is used as a member of a fuel cell that constitutes a fuel cell stack, and has a function to supply an electrode with fuel gas or air through gas flow channels and a function to collect electrons generated at the electrode. In the past, as such a separator for fuel cells, there has been used a separator for fuel cells configured such that a carbon plate is formed with gas flow channels.

When a carbon plate is used as a material that constitutes a separator for fuel cells, however, there is a problem in that the material cost and working cost increase. It is therefore required to substitute the carbon plate with a metal, such as aluminum, stainless steel or titanium alloy, which can reduce the material cost and can be formed with gas flow channels at low cost by means of high speed press working.

To this end, Patent Document 1 (Japanese Patent Application Publication No. 2001-351642) discloses a separator for fuel cells configured such that a metallic base material is used as a mother material of the separator for fuel cells and a first layer of a certain element and a gold plate layer are formed on the metallic base material by means of electrolytic plating, for example.

SUMMARY OF THE INVENTION

When the gold plate layer is formed by means of electrolytic plating at the time of manufacturing a separator for fuel cells as in the above-described Patent Document 1, manufacturing processes as below may have to be performed. That is, a first manufacturing process may be mentioned as a method in which a gold plate layer is formed on a metallic base material by means of electrolytic plating and thereafter gas flow channels are formed by means of press working. A second manufacturing process may otherwise be mentioned as a method in which gas flow channels are formed by means of press working for a metallic base material and thereafter a gold plate layer is formed on the metallic base material by means of electrolytic plating. According to the first manufacturing process, however, a problem may arise in that cracks occur in the gold plate layer due to stresses applied when the press working is performed, because the gas flow channels are formed by means of press working after forming the gold plate layer on the metallic base material by means of electrolytic plating. On the other hand, the second manufacturing process involves a problem in that deposition of the gold plate layer may be nonuniform to cause unformed parts of the gold plate layer because the electrolytic plating is performed for irregular parts that constitute the gas flow channels.

Formation of the gold plate layer on the metallic base material may also be performed by means of electroless plating. In this case, if a method like in the above second manufacturing process is used such that gas flow channels are formed by means of press working for the metallic base material and thereafter a gold plate layer is formed by means of electroless plating, the gold plate layer can be formed for the irregular parts that constitute the gas flow channels in a state in which the gold plate layer is uniform and unformed parts of the gold plate layer do not occur. However, if electroless substitution plating is used as the electroless plating, the metallic base material as a material to be plated with gold may locally dissolve to generate micro recesses at the surface. The micro recesses thus generated will cause poor deposition of gold, so that pinholes may occur at the surface of the gold plate layer to be formed. This may result in problems in that the obtained separator for fuel cells deteriorates in its corrosion resistance and increases in the contact resistance with another component, and the function of collecting electrons becomes poor. In order to solve such problems due to pinholes, there may be used a method of further forming a gold plate layer by means of electroless reduction plating on the gold plate layer formed by means of electroless substitution gold plating thereby to cover the pinholes. In this method, however, the gold plate layers may have to be formed with a large film thickness in total to allow the electroless reduction plating to cover the pinholes, which may be problematic in cost.

In such circumstances, the present inventor and his colleagues performed intensive studies on the relationship between the smoothness of a material to be plated with gold and dissolution of the material, and have found that such dissolution of the material when performing electroless substitution plating is caused by poor smoothness of the material, and that such problems can be solved by controlling the surface roughness of a material to be plated with gold. The present invention has been made on the basis of such knowledge, and is to provide a separator for fuel cells in which a gold plate layer can be uniformly formed for irregular parts that constitute gas flow channels and the occurrence of unformed parts and pinholes in the gold plate layer is prevented without increasing the film thickness of the gold plate layer and which is excellent in the corrosion resistance and the conductivity.

That is, according to an aspect of the present invention, there is provided a separator for fuel cells that comprises: a base material; an underlying plate layer formed on the base material; and a gold plate layer formed on the underlying plate layer by means of electroless plating. The separator for fuel cells is characterized in that a face of the underlying plate layer facing the gold plate layer has an arithmetic average roughness Ra of 80 nm or less.

In the separator for fuel cells according to the present invention, the underlying plate layer may preferably be formed on the base material of which a surface was preliminarily polished by using at least one method of mechanical polishing, chemical polishing, and chemical mechanical polishing.

The underlying plate layer may preferably be formed by using a plating bath that contains a brightening agent.

The underlying plate layer may preferably have a surface that is polished by using at least one method of mechanical polishing, chemical polishing, and chemical mechanical polishing after the underlying plate layer was formed on the base material.

According to another aspect of the present invention, there is provided a fuel cell configured using the above separator for fuel cells.

According to still another aspect of the present invention, there is provided a fuel cell stack configured such that a plurality of the above fuel cells are stacked together.

According to a further aspect of the present invention, there is provided a method of manufacturing a separator for fuel cells. The method is characterized by comprising: a step of forming an underlying plate layer on a surface of a base material, the underlying plate layer having a surface that has an arithmetic average roughness Ra of 80 nm or less; and a step of forming a gold plate layer on the underlying plate layer by means of electroless plating.

According to the present invention, there can be provided a separator for fuel cells in which the gold plate layer can be uniformly formed for irregular parts that constitute gas flow channels and the occurrence of unformed parts and pinholes in the gold plate layer is prevented without increasing the film thickness of the gold plate layer and which is excellent in the corrosion resistance and the conductivity.

DESCRIPTION OF THE PREFERRED EMBODIMENT

The separator for fuel cells according to the present invention will hereinafter be described.

The separator for fuel cells according to the present invention comprises: a base material; an underlying plate layer formed on the base material; and a gold plate layer formed on the underlying plate layer by means of electroless plating, and is characterized in that a face of the underlying plate layer facing the gold plate layer has an arithmetic average roughness Ra of 80 nm or less.

<Base Material>

The base material is not particularly limited. Examples of the base material include steel, stainless steel, Al, Al alloy, Ti, Ti alloy, Cu, Cu alloy, Ni, and Ni alloy. The base material may be used without particular restriction after being worked into a necessary shape or form as that of a separator for fuel cells.

The thickness of the base material is also not particularly limited, and may be appropriately selected depending on the use. The thickness may preferably be 0.05 to 2.0 mm, and more preferably 0.1 to 0.3 mm.

In order that a separator for fuel cells can be obtained in which the gold plate layer is more uniformly formed as will be described later, it is preferred that the surface of the base material to be used in the present invention is preliminarily formed with irregular parts (gas flow channels) that function as flow channels for fuel gas or air when the base material is used as a component of the separator for fuel cells, and the underlying plate layer and the gold plate layer are formed thereon. The method of forming such gas flow channels on the base material may be, but is not particularly limited to, a method of forming the gas flow channels by means of press working, for example.

<Underlying Plate Layer>

The underlying plate layer may be a plate layer that is formed on the base material by performing a plating process and comprises one or more metals. The underlying plate layer acts as an underlying layer for smoothly forming the gold plate layer to be described later.

In the present invention, the underlying plate layer is formed to have an arithmetic average roughness Ra on the surface of 80 nm or less, preferably 10 nm or less, and more preferably 2 nm or less. The arithmetic average roughness Ra on the surface of the underlying plate layer within the above range allows the surface of the underlying plate layer to have sufficient smoothness. This can suppress the local dissolution of the underlying plate layer, which is a material to be plated with gold, when forming the gold plate layer by means of electroless plating, in particular by means of electroless substitution plating. It is thus possible to prevent the occurrence of recesses at the surface of the underlying plate layer due to the local dissolution. Moreover, this allows the gold plate layer to be uniformly formed in such a state that the occurrence of unformed parts and pinholes in the gold plate layer is prevented without increasing the film thickness of the gold plate layer.

The method of allowing the arithmetic average roughness Ra on the surface of the underlying plate layer to fall within the above range is not particularly limited. Examples of the method include a method of polishing the surface of an underlying plate layer that was formed by a plating process, a method of performing a plating process on a preliminarily polished base material thereby to form an underlying plate layer, and a method of adding a brightening agent to a plating bath for forming an underlying plate layer. Any one of these method may be solely used, or two or more methods may be used in combination.

The method of polishing the surface of an underlying plate layer that was formed by a plating process may preferably be at least one of mechanical polishing, chemical polishing, and chemical mechanical polishing, and may particularly preferably be chemical polishing, because such a method allows the surface to be moderately smoothed.

When the method of performing a plating process on a preliminarily polished base material thereby to form an underlying plate layer is employed, the method of polishing the base material may preferably be at least one of mechanical polishing, chemical polishing, and chemical mechanical polishing, and may particularly preferably be chemical polishing. The arithmetic average roughness Ra on the surface of the polished base material may preferably be 100 nm or less, and more preferably 1 nm or less. By preliminarily polishing the base material to have a smooth surface, the underlying plate layer formed thereon can also be smooth.

When the method of adding a brightening agent to a plating bath for forming an underlying plate layer is employed, any brightening agent can be used to smooth the surface of the underlying plate layer to be obtained, such as due to an action of making fine crystals of components that constitute the underlying plate layer and an action of improving the leveling ability of the plating bath. Examples of the brightening agent include an organosulfur compound and an organonitrogen compound. In the present invention, the organosulfur compound may be preferred as the brightening agent in view of reducing the environmental burdens.

Components that constitute the underlying plate layer are not particularly limited. Any metal element that can form a plate layer may be used. Examples thereof include at least one metal element selected from Ni, Fe, Co, Cu, Zn and Sn. One type of these elements may be solely contained to constitute the underlying plate layer, or two or more types may be used in combination, such as in Ni—Fe, Ni—Co and Ni—Cu. Each of Ni, Fe, Co, Cu, Zn and Sn is an element that generally has a property capable of independently forming a plate layer on the base material, and has an action of allowing the underlying plate layer to adhere tightly to the base material. Among these elements, at least one element selected from Ni and Co may preferably be used in the present invention, and Ni may particularly preferably be used, in view of preventing the plating liquid from self-decomposition and enhancing the stability of the plating liquid.

The underlying plate layer may further contain an additional element such as at least one element selected from P and B in addition to the above metal element or elements. P and B are each a metalloid that constitutes a reductant in the plating bath for forming the underlying alloy layer, and may often be unavoidably incorporated into the underlying plate layer in general when the underlying plate layer is formed. The metalloid to constitute such a reductant may preferably be P in view of preventing the plating liquid from self-decomposition and enhancing the stability of the plating liquid. It is preferred in this case to use Ni—P as the underlying plate layer.

The underlying plate layer may slightly contain impurities, which are unavoidably mixed therein, to such an extent that does not inhibit a formation effect of the underlying plate layer, i.e., an effect of preventing the occurrence of unformed parts and pinholes in the gold plate layer to be formed on the underlying plate layer. Examples of such unavoidable impurities include a heavy metal, such as Pb, Tl and Bi, which is added as a stabilizer that prevents the plating liquid from self-decomposition and stabilizes the plating liquid. In view of reducing the environmental burdens, Bi may preferably be used as the stabilizer.

The method of forming the underlying plate layer is not particularly limited, and any method can be used, such as a method by means of electrolytic plating, electroless plating or sputtering, among which the method by means of electroless plating may preferably be used. In particular, when the method by means of electroless plating is used as the method of forming the underlying plate layer, the underlying plate layer can be more uniformly formed for irregular parts that constitute gas flow channels even when the base material to be used is a base material that is formed with the gas flow channels (flow channels used as those for fuel gas or air when the base material is used as a component of a separator for fuel cells), so that the gold plate layer can also be more uniformly formed on the underlying plate layer.

For example, when the underlying plate layer is formed by means of electroless plating, plating may be performed on the base material using a plating bath (underlying layer plating bath) that contains each element to constitute the underlying plate layer, a reductant, and a complexing agent.

As an example, when an underlying plate layer of Ni—P is formed by means of electroless plating, a commonly-used Ni—P plating bath can be used as the underlying layer plating bath. Specific examples of the Ni—P plating bath include a plating bath that contains: a nickel salt such as nickel chloride, nickel sulfate, nickel nitrate and nickel acetate; a phosphorus-containing reductant such as hypophosphite; and a complexing agent such as citric acid. Here, when the Ni—P plating bath is used as the underlying layer plating bath, it is preferred to use nickel chloride as the nickel salt.

The above exemplifies the case in which the underlying alloy layer is formed of Ni—P, but also in the case in which the underlying alloy layer is formed of other material than Ni—P, there may be used an underlying layer plating bath that is obtained in a similar manner by appropriately adjusting each component corresponding to each element to constitute the underlying plate layer.

When the underlying plate layer is formed by means of electroless plating, it is preferred that the underlying plate layer is formed using the above-described underlying layer plating bath under a condition of pH of 4.0 to 7.0, a bath temperature of 30° C. to 50° C., and an immersion time of 5 to 20 minutes.

The thickness of the underlying plate layer may preferably be 0.01 to 1.0 µm, and more preferably 0.05 to 0.2 µm. The thickness of the underlying plate layer within the above range allows the gold plate layer to be more uniformly formed on the underlying plate layer when the gold plate layer is obtained by means of electroless plating.

In the present invention, when the underlying plate layer is formed on the base material, the underlying plate layer may be formed directly on the base material, but a modifying layer may be provided between the base material and the underlying plate layer to enhance the interfacial adhesion to the base material. Any type of modifying layer may be employed as long as the modifying layer can adhere tightly both to the base material and the underlying plate layer. In this regard, a preferred layer contains one or more metal elements that are the same as a part of the metal elements which constitute the underlying plate layer, and a plate layer may be particularly preferred which comprises the same components as those of the underlying plate layer. For example, when an underlying plate layer of Ni—P is formed, the modifying layer may preferably be a Ni-based layer that contains Ni, i.e., the metal element which constitutes the underlying plate layer, and may particularly preferably be a layer that is formed of Ni—P which is the same as the underlying plate layer. One modifying layer may be provided, or two or more modifying layers may also be provided. When two or more modifying layers are provided, components that constitute respective layers may be or may not be the same. The method of forming the modifying layer or layers is not particularly limited. The modifying layer or layers can be formed by an appropriate method such as electrolytic plating, electroless plating and sputtering.

<Gold Plate Layer>

The gold plate layer is a layer that is formed on the underlying plate layer by performing an electroless plating process. Examples of the electroless plating process include an electroless substitution plating process and an electroless reduction plating process. The gold plate layer may be formed by performing the electroless substitution plating process and further performing the electroless reduction plating process.

The thickness of the gold plate layer may preferably be 1 to 200 nm, and more preferably 5 to 100 nm. If the thickness of the gold plate layer is unduly small, a uniform gold plate layer will not be formed on the underlying plate layer, so that the corrosion resistance and the conductivity may possibly deteriorate when the gold plate layer is used as a part of a separator for fuel cells. On the other hand, unduly large thickness of the gold plate layer may be disadvantageous in cost.

As described above, it is preferred in the present invention to use the base material, as a base material to form the underlying plate layer and the gold plate layer thereon, which is preliminarily formed on its surface with irregular parts (gas flow channels) that function as flow channels for fuel gas or air when the base material is used as a component of a separator for fuel cells and to form the underlying plate layer and the gold plate layer on such a base material. By using such a base material formed preliminarily with the gas flow channels, it is not necessary to perform working for forming the gas flow channels after the gold plate layer was formed, and it is possible to prevent cracks in the gold plate layer due to stresses caused by the working for forming the gas flow channels.

In particular, since the gold plate layer is formed by means of electroless plating in the present invention, the gold plate layer can be formed in a uniform state even when using the base material formed preliminarily with the gas flow channels. More specifically, when the gold plate layer is formed by means of electrolytic plating rather than by electroless plating, some variation occurs in the formation rate of the plate film such as due to the plating deposition occurring preferentially on protruding portions among the irregular parts as the gas flow channels. Such variation in the plating rate will cause nonuniform deposition of the gold plate layer to be obtained, which may be problematic in that unformed parts occur in the gold plate layer. In contrast, according to the present invention, electroless plating is employed to form the gold plate layer thereby to allow the gold plate layer to be formed uniformly for the irregular parts that constitute the gas flow channels, and such a problem can thus be solved.

In addition, when using a base material formed preliminarily with the gas flow channels, it is preferred to perform the formation of the underlying plate layer by means of electroless plating. Forming the underlying plate layer by means of electroless plating allows the underlying plate layer to be formed uniformly for the irregular parts that constitute the gas flow channels on the base material, and it is thereby possible to obtain a more uniform gold plate layer that is to be formed on the underlying plate layer.

When using electrolytic plating, formation of the gold plate layer for irregular parts may be nonuniform. Therefore, there may be considered a method of forming a gold plate layer by means of electrolytic plating on a base material that is not formed with gas flow channels (i.e., a flat plate-like base material) and thereafter performing the working for forming gas flow channels. According to such a method of forming the gas flow channels after forming the gold plate layer, however, there is a problem in that cracks occur in the gold plate layer due to stresses applied when the gas flow channels are formed.

When using electrolytic plating, there may otherwise be considered a method of forming a smooth underlying plate layer (such as having a small arithmetic average roughness Ra) for a base material formed preliminarily with gas flow channels and forming a gold plate layer thereon by means of electrolytic plating thereby to manufacture a separator for fuel cells. However, such a method employs electrolytic plating to form the gold plate layer, and there is a problem in that unformed parts of the gold plate layer occur at irregular parts of the gas flow channels regardless of whether or not the underlying plate layer is smooth. According to the method of using electrolytic plating, therefore, unformed parts of the gold plate layer occur at the irregular parts of the gas flow channels even when the arithmetic average roughness Ra or the like of the underlying plate layer is small, and there is a problem in that the separator for fuel cells to be obtained will have poor corrosion resistance and conductivity.

In contrast, according to the present invention, electroless plating is employed to form the gold plate layer thereby to allow the gold plate layer to be formed in a uniform state even when a base material formed preliminarily with the gas flow channels is used as the base material. According to this advantage, it is not necessary to perform working for forming gas flow channels after the gold plate layer was formed, and the gold plate layer can thus be prevented from generating cracks due to stresses caused by working for forming the gas flow channels.

The separator for fuel cells according to the present invention comprises a smooth underlying plate layer, of which the surface has an arithmetic average roughness Ra of 80 nm or less, on a base material, and is configured such that a gold plate layer is formed thereon by means of electroless plating. According to this feature, advantageous effects can be obtained as below.

First, according to the present invention, the surface of the underlying plate layer is made smooth with an arithmetic average roughness Ra of 80 nm or less thereby to suppress the local dissolution of the underlying plate layer due to the surface of the underlying plate layer being rough when the gold plate layer is formed on the underlying plate layer by means of electroless plating, in particular by means of electroless substitution plating. It is thus possible to prevent the occurrence of recesses at the surface of the underlying plate layer. This allows the gold plate layer to be uniformly formed in such a state that the occurrence of unformed parts and pinholes in the gold plate layer is prevented without increasing the film thickness of the gold plate layer.

Furthermore, according to the present invention, a method of electroless plating, such as an electroless substitution plating process, is used as the method of forming the gold plate layer. Therefore, even when the base material is formed preliminarily with gas flow channels, the gold plate layer can be formed uniformly for irregular parts that constitute the gas flow channels.

Thus, the separator for fuel cells according to the present invention is configured such that the underlying plate layer has an arithmetic average roughness Ra of 80 nm or less and the gold plate layer is formed by means of electroless plating, thereby: to effectively prevent the occurrence of unformed parts and pinholes in the gold plate layer; to have excellent corrosion resistance and conductivity; and to be advantageous in cost because the gold plate layer is not necessary to be formed with a large film thickness.

EXAMPLES

The present invention will be more specifically described hereinafter with reference to examples, but the present invention is not limited to these examples.

Example 1

Electroless plating was performed to form a Ni—P plate layer (content ratio of P: 12 wt %) having a thickness of 10 μm on 5086 aluminum alloy of 5000 series provided by JIS H4000 (Si: 0.4 wt %, Fe: 0.5 wt %, Cu: 0.1 wt %, Mn: 0.2 wt %, Mg: 3.5 wt %, Zn: 0.25 wt %, Cr: 0.25 wt %, and Al: the balance), and a base material having a total thickness of 1.27 mm was thus prepared.

Subsequently, chemical mechanical polishing was performed for the prepared base material using an alumina polishing agent (an alumina abrasive particle diameter of 0.6 μm, a concentration of 3.9 wt %, and additives of hydrogen peroxide water, organic acid, sulfuric acid and surfactant) and a colloidal silica polishing agent having a smaller particle diameter than that of the alumina abrasive particle so that the base material surface would have an arithmetic average roughness Ra of 0.1 nm. Measurement of the arithmetic average roughness Ra was performed by scanning a field of view of 50 μm×50 μm using a laser microscope (OLS3000 available from Olympus Corporation).

Thereafter, the polished base material was degreased and then washed with water, and electroless plating was performed using a Ni—P plating bath (ICP NICORON GM-NP available from Okuno Chemical Industries Co., Ltd.) to form a Ni—P plate layer (content ratio of P: 7 wt %) having a thickness of 2 µm on the base material. The Ni—P plate layer was thus obtained with its surface of an arithmetic average roughness Ra of 1.2 nm.

Subsequently, for the base material formed with the Ni—P plate layer, a gold plate layer was formed to have a thickness of 31 nm on the Ni—P plate layer using an electroless substitution gold plating bath (FLASH GOLD NC available from Okuno Chemical Industries Co., Ltd.) to perform an electroless substitution plating process under a condition of 55° C. and 1 minute and then using an electroless reduction gold plating bath (SELF GOLD OTK available from Okuno Chemical Industries Co., Ltd.) to perform an electroless reduction plating process under a condition of 60° C. and 1 minute, and a gold plate coated material was thus obtained.

Examples 2 to 4

Gold plate coated materials were obtained like in Example 1 except for changing the immersion time in the electroless reduction plating when forming the gold plate layers so that the thicknesses of the gold plate layers to be formed would be 49 nm (Example 2), 70 nm (Example 3), and 92 nm (Example 4).

Example 5

A base material of aluminum alloy having a total thickness of 1.27 mm was prepared like in Example 1 to be formed with a Ni—P plate layer (content ratio of P: 12 wt %) having a thickness of 10 µm. Subsequently, chemical polishing was performed for the prepared base material using a chemical polishing fluid for aluminum (Clean Bright #1 available from RIN KAGAKU KOGYO Co., Ltd.), and an etching process and a zincate process were then performed for the surface of the base material. The arithmetic average roughness Ra of the base material surface after the chemical polishing was 67.3 nm.

Thereafter, for the base material treated with the etching process and the zincate process, electroless plating was performed using a Ni—P plating bath (ICP NICORON GM-NP available from Okuno Chemical Industries Co., Ltd.) to form a Ni—P plate layer (content ratio of P: 7 wt %) having a thickness of 2 µm on the base material. The Ni—P plate layer was thus obtained with its surface of an arithmetic average roughness Ra of 76.8 nm.

Subsequently, for the base material formed with the Ni—P plate layer, a gold plate layer was formed to have a thickness of 32 nm on the Ni—P plate layer using an electroless substitution gold plating bath (FLASH GOLD NC available from Okuno Chemical Industries Co., Ltd.) to perform an electroless substitution plating process under a condition of 55° C. and 1 minute and then using an electroless reduction gold plating bath (SELF GOLD OTK available from Okuno Chemical Industries Co., Ltd.) to perform an electroless reduction plating process under a condition of 60° C. and 1 minute, and a gold plate coated material was thus obtained.

Examples 6 to 8

Gold plate coated materials were obtained like in Example 5 except for changing the immersion time in the electroless reduction plating when forming the gold plate layers so that the thicknesses of the gold plate layers to be formed would be 55 nm (Example 6), 72 nm (Example 7), and 110 nm (Example 8).

Example 9

A base material of aluminum alloy having the same composition as that of the aluminum alloy used in Example 1 and a thickness of 0.2 mm was prepared by being worked into a size of a width of 15 mm and a length of 140 mm. Channel working of a depth of 5 mm and a pitch of 5 mm was performed for a surface of the prepared base material. Subsequently, for the base material processed with the channel working, chemical polishing was performed using a chemical polishing fluid for aluminum (Clean Bright #1 available from RIN KAGAKU KOGYO Co., Ltd.), and an etching process and a zincate process were then performed for the surface of the base material. The arithmetic average roughness Ra of the base material surface after the chemical polishing was 55.6 nm.

Thereafter, for the base material treated with the etching process and the zincate process, electroless plating was performed using a Ni—P plating bath (ICP NICORON GM-NP available from Okuno Chemical Industries Co., Ltd.) to form a Ni—P plate layer (content ratio of P: 7 wt %) having a thickness of 2 µm on the base material. The Ni—P plate layer was thus obtained with its surface of an arithmetic average roughness Ra of 65 nm.

Subsequently, for the base material formed with the Ni—P plate layer, a gold plate layer was formed to have a thickness of 62 nm on the Ni—P plate layer using an electroless substitution gold plating bath (FLASH GOLD NC available from Okuno Chemical Industries Co., Ltd.) to perform an electroless substitution plating process under a condition of 55° C. and 1 minute and then using an electroless reduction gold plating bath (SELF GOLD OTK available from Okuno Chemical Industries Co., Ltd.) to perform an electroless reduction plating process under a condition of 60° C. and 3 minutes, and a gold plate coated material was thus obtained.

Comparative Example 1

A base material of aluminum alloy having a total thickness of 1.27 mm was prepared like in Example 1 to be formed with a Ni—P plate layer (content ratio of P: 12 wt %) having a thickness of 10 µm. Subsequently, an etching process and a zincate process were performed for the prepared base material without performing any polishing.

Thereafter, for the base material treated with the etching process and the zincate process, electroless plating was performed using a Ni—P plating bath (ICP NICORON GM-NP available from Okuno Chemical Industries Co., Ltd.) to form a Ni—P plate layer (content ratio of P: 7 wt %) having a thickness of 2 µm on the base material. The Ni—P plate layer was thus obtained with its surface of an arithmetic average roughness Ra of 166 nm.

Subsequently, for the base material formed with the Ni—P plate layer, a gold plate layer was formed to have a thickness of 33 nm on the Ni—P plate layer using an electroless substitution gold plating bath (FLASH GOLD NC available from Okuno Chemical Industries Co., Ltd.) to perform an electroless substitution plating process under a condition of 55° C. and 1 minute and then using an electroless reduction gold plating bath (SELF GOLD OTK available from Okuno Chemical Industries Co., Ltd.) to perform an electroless reduction plating process under a condition of 60° C. and 1 minute, and a gold plate coated material was thus obtained.

Comparative Examples 2 and 3

Gold plate coated materials were obtained like in Comparative Example 1 except for changing the immersion time in the electroless reduction plating when forming the gold plate layers so that the thicknesses of the gold plate layers to be formed would be 75 nm (Comparative Example 2) and 117 nm (Comparative Example 3).

Evaluation of Corrosion Resistance of Gold Plate Layer

Thereafter, for the gold plate coated materials obtained in Examples 1 to 9 and Comparative Examples 1 to 3, evaluation of corrosion resistance was conducted. Specifically, the evaluation of corrosion resistance was performed through: masking each gold plate coated material with a polyimide tape to expose a surface area of 35 mm longitudinal and 20 mm lateral; immersing the gold plate coated material into sulfuric acid aqueous solution of 90° C. (volume: 80 ml, pH: 1.0) for 100 hours; thereafter taking out the gold plate coated material; and measuring a mass concentration (g/L) of ions (Ni, P and Al) dissolved from the gold plate coated material into the sulfuric acid aqueous solution using ICP (ICPE-9000 available from SHIMADZU CORPORATION). In addition, evaluation of corrosion resistance was also performed for SUS316L usually used as a material for a separator for fuel cells by, in a similar manner, immersing it into sulfuric acid aqueous solution and measuring a mass concentration (g/L) of ions (Fe, Cr, Mo and Ni) dissolved into the sulfuric acid aqueous solution using ICP. Results are shown in FIG. 1.

Figure 1:
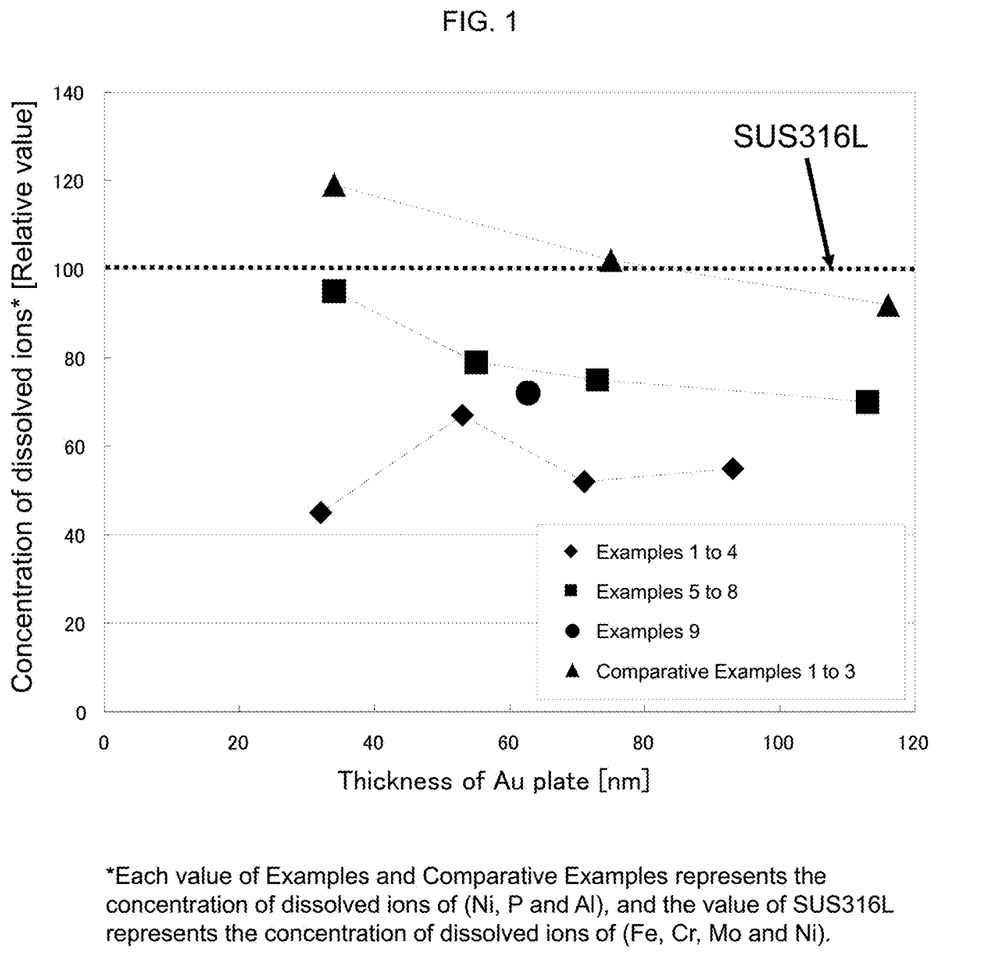
FIG. 1 is a graph which shows concentrations of dissolved ions from gold plate coated materials obtained in examples and comparative examples.

In the graph shown in FIG. 1, the evaluation result in each of examples and comparative examples represents the mass concentration of Ni, P and Al ions dissolved from the gold plate coated material, while the evaluation result of SUS316L represents the mass concentration of Fe, Cr, Mo and Ni ions dissolved from SUS316L. Also in the graph shown in FIG. 1, the mass concentration of ions (Ni, P and Al) dissolved from the gold plate coated material of each of examples and comparative examples is represented by a relative value when the value of the mass concentration of ions (Fe, Cr, Mo and Ni) dissolved from SUS316L is 100.

Results of FIG. 1 show that, in the gold plate coated materials of Examples 1 to 9 in which the arithmetic average roughness Ra of the surface of the underlying plate layer formed on the base material was 80 nm or less and the gold plate layer was formed by means of electroless plating, the dissolution of ions from the base material was able to be effectively suppressed to exhibit excellent corrosion resistance compared to SUS316L even when the thickness of the gold plate layer was small. In particular, the gold plate coated material of Example 9, in which the channel working was performed for the base material and the gold plate layer was then formed by means of electroless plating, was confirmed such that the gold plate layer was well formed even for the irregular parts formed by the channel working and the dissolution of ions from the base material was effectively suppressed.

In contrast, according to the gold plate coated materials of Comparative Examples 1 to 3 in which the arithmetic average roughness Ra of the surface of the underlying plate layer formed on the base material was over 80 nm, more ions dissolved from the base material compared to SUS316L when the thickness of the gold plate layer was small, thus resulting in poor corrosion resistance.

Measurement of Volume Resistivity

Figure 2:
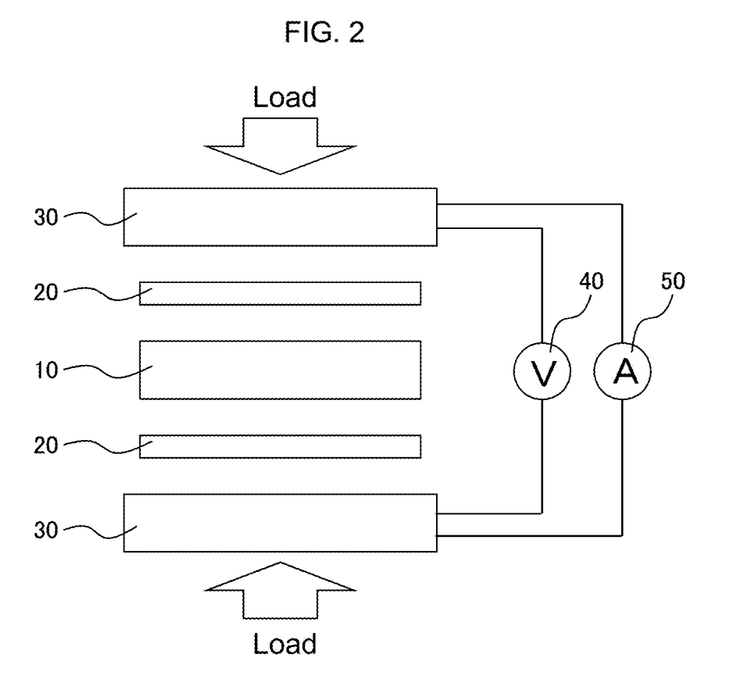
FIG. 2 is a diagram for explaining a method of measuring a volume resistivity.

Next, the gold plate coated material obtained in Example 6 was used to form a measurement system as shown in FIG. 2, and measurement of the volume resistivity was performed using the measurement system formed. Note that the measurement system shown in FIG. 2 is configured of: a test piece 10 of the gold plate coated material obtained in Example 6; carbon cloths 20; gold plate-coated copper electrodes 30; a voltmeter 40; and an ammeter 50. Specifically, at the time of measurement of the volume resistivity, the test piece 10, which was obtained by working the gold plate coated material into a size of width of 20 mm, length of 20 mm and thickness of 1.27 mm, was first fixed by being interposed between the gold plate-coated copper electrodes 30 via the carbon cloths 20 (part number: TGP-H-090, available from Toray Industries, Inc), and the measurement system shown in FIG. 2 was thus provided. Subsequently, a resistance value R between the upper and lower carbon cloths 20 sandwiching the test piece was measured using an ohm meter (mΩ HiTESTER 3540 available from HIOKI E. E. CORPORATION) while applying a constant load (physical load) to the copper electrodes 30. The measured resistance value R was used as the basis to calculate a volume resistivity ρ in accordance with Equation (1) below:

$$\rho = R \cdot S/L \tag{1}$$

In the above Equation (1), S represents the cross-sectional area (width 20 mm×length 20 mm) of the test piece 10, and L represents the thickness (thickness 1.27 mm) of the test piece 10. As apparent from the above Equation (1), the volume resistivity ρ does not depend on the cross-sectional area and the thickness of the test piece 10, and represents the conductivity of the test piece 10 itself. In the present example, various values of the volume resistivity ρ were measured at different loads while varying the load applied to the copper electrodes 30. The obtained results are shown in FIG. 3.

Figure 3:
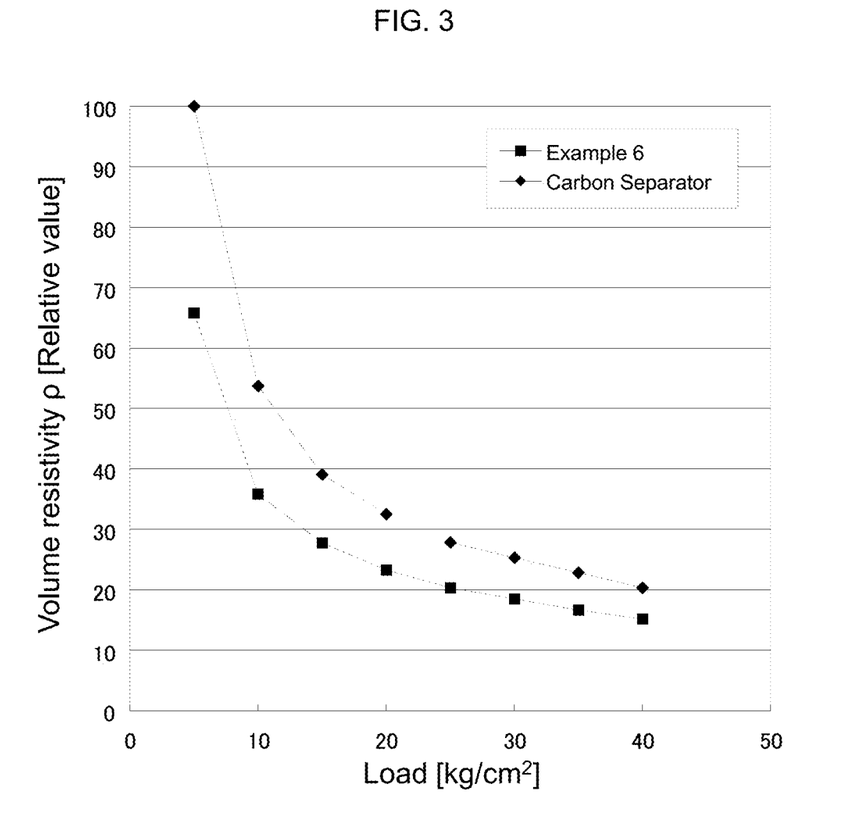
FIG. 3 is a graph which shows volume resistivities of a gold plate coated material obtained in an example and a carbon separator.

FIG. 3 also shows values of the volume resistivity ρ measured using a carbon separator (available from TOYO Corporation) as comparative data. The volume resistivity p of the carbon separator was obtained by performing measurement in the above-described measurement system shown in FIG. 2 using a test piece 10 obtained by working the carbon separator into a size of width of 20 mm, length of 20 mm and thickness of 1.0 mm. In FIG. 3, the measurement results of the volume resistivity ρ are represented by relative values when the volume resistivity ρ of the carbon separator at a load of 5 kg/cm$_2$ is 100.

The results of FIG. 3 show that, in the gold coated material of Example 6 in which the arithmetic average roughness Ra of the surface of the underlying plate layer formed on the base material was 80 nm or less and the gold plate layer was formed by means of electroless plating, the volume resistivity ρ was a lower value than that of the conventional carbon separator at any load value, thus resulting in excellent conductivity.

DESCRIPTION OF REFERENCE NUMERALS

10 . . . Test piece
20 . . . Carbon cloth
30 . . . Copper electrode
40 . . . Voltmeter
50 . . . Ammeter

What is claimed is:

1. A separator for fuel cells comprising:
   a base material composed of Al or Al alloy, the base material having a modifying layer which contains Ni—P formed on a surface thereof;
   an underlying plate layer which contains Ni—P and has a thickness of 0.01 to 2 μm formed on the base material via the modifying layer; and
   a gold plate layer formed on the underlying plate layer by means of electroless substitution plating process,
   wherein a weight content ratio of P in the modifying layer is higher than a weight content ratio of P in the underlying plate layer,
   wherein a face of the underlying plate layer facing the gold plate layer has an arithmetic average roughness of 80 nm or less, and
   wherein a thickness of the gold plate layer is 1 to 72 nm.

2. The separator for fuel cells according to claim 1, wherein the underlying plate layer is formed on the base material of which a surface was preliminarily polished by using at least one method of mechanical polishing, chemical polishing, and chemical mechanical polishing.

3. The separator for fuel cells according to claim 1, wherein the underlying plate layer is formed by using a plating bath that contains a brightening agent.

4. The separator for fuel cells according to claim 1, wherein the underlying plate layer has a surface that is polished by using at least one method of mechanical polishing, chemical polishing, and chemical mechanical polishing after the underlying plate layer was formed on the base material.

5. A fuel cell configured using the separator for fuel cells according to claim 1.

6. A fuel cell configured using the separator for fuel cells according to claim 2.

7. A fuel cell configured using the separator for fuel cells according to claim 3.

8. A fuel cell configured using the separator for fuel cells according to claim 4.

9. A fuel cell stack configured such that a plurality of the fuel cells according to claim 5 are stacked together.

10. A fuel cell stack configured such that a plurality of the fuel cells according to claim 6 are stacked together.

11. A fuel cell stack configured such that a plurality of the fuel cells according to claim 7 are stacked together.

12. A fuel cell stack configured such that a plurality of the fuel cells according to claim 8 are stacked together.

13. A method of manufacturing a separator for fuel cells comprising:
    preparing a base material composed of Al or Al alloy, the base material having a modifying layer which contains Ni—P formed on a surface thereof;
    forming an underlying plate layer which contains Ni—P and has a thickness of 0.01 to 2 μm on a surface of a base material via the modifying layer, the underlying plate layer having a surface that has an arithmetic average roughness Ra of 80 nm or less; and
    forming a gold plate layer with a thickness of 1 to 72 nm on the underlying plate layer by means of a substitution plating process,
    wherein a weight content ratio of P in the modifying layer is higher than a weight content ratio of P in the underlying plate layer.

14. The method of manufacturing a separator for fuel cells according to claim 13, further comprising preliminary polishing a surface of the base material by using at least one method of mechanical polishing, chemical polishing, and chemical mechanical polishing before the forming an underlying plate layer.

15. The method of manufacturing a separator for fuel cells according to claim 13, wherein the underlying plate layer is formed by using a plating bath that contains a brightening agent.

16. The method of manufacturing a separator for fuel cells according to claim 13, further comprising polishing a surface of the underlying plate layer by using at least one method of mechanical polishing, chemical polishing, and chemical mechanical polishing after the forming an underlying plate layer.

* * * * *